UNITED STATES PATENT OFFICE.

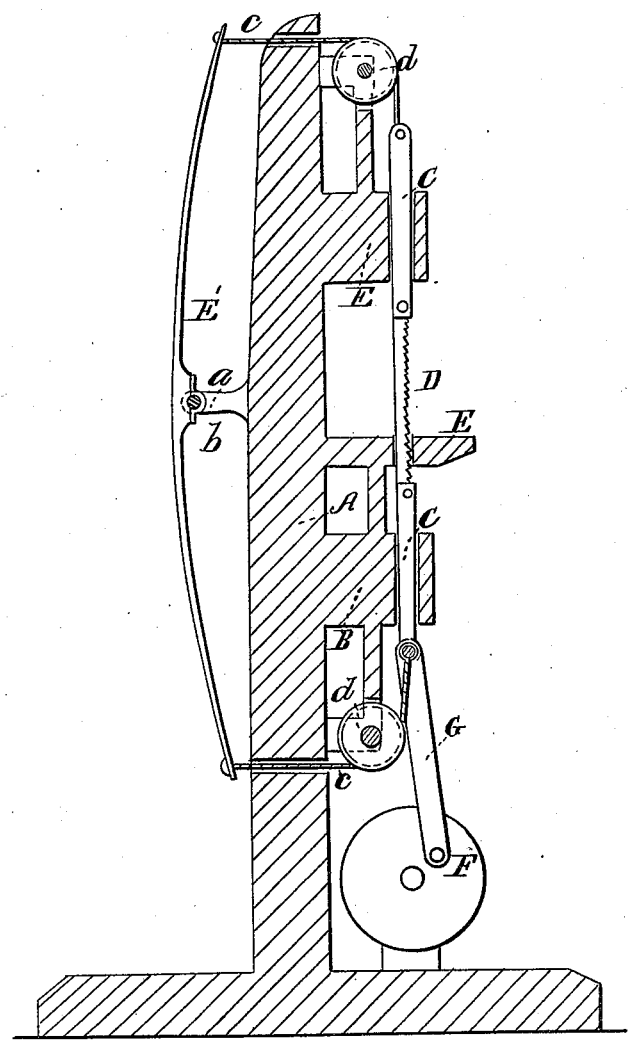

THEODORE SHARP, NORTH GREENBUSH, NEW YORK.

METHOD OF STRAINING MULEY-SAWS.

Specification of Letters Patent No. 14,413, dated March 11, 1856.

*To all whom it may concern:*

Be it known that I, THEODORE SHARP, of North Greenbush, in the county of Rensselaer and State of New York, have invented a new and improved mode of straining reciprocating saws, those which are used without sashes and technically termed "muley-saws;" and I do hereby declare that the following is a full, clear, and exact description of the same, reference being had to the annexed drawing, making a part of this specification, said drawing being an elevation of my improvement, the framing being bisected vertically.

My invention consists in attaching the upper and lower ends of the saw to a pivoted and vibrating elastic bar, as will be presently shown and described, whereby the saw is properly strained, the bar operating or vibrating on its pivot as the saw works up and down.

To enable others skilled in the art to fully understand and construct my invention, I will proceed to describe it.

A, represents a vertical post having two projections, B, B, attached to one of its sides, said projections serving as guides or bearings for slides C, C, which are attached, one to the upper and the other to the lower end of the saw, D.

E, represents a platform or bed on which the stuff to be sawed is placed. This platform or bed is attached to the post, A, and the saw, D, passes through it as plainly shown in the drawing.

E', represents a bar, the center of which is secured by a pivot, (*a*), to arms, (*b*), attached to the side of the post opposite to the side to which the projections, B, B, are attached. The bar, E', is allowed to work freely on the pivot, (*a*). The ends of the bar, E, are elastic, and a cord or chain (*c*) is attached to each end of the bar, said cords or chains passing through the post and around pulleys, (*d*), (*d*), and are attached to the ends of the slides C, C, as clearly shown in the drawing. The slides, C, C, are attached to the ends of the saw, D, and the spring or elasticity of the bar, E', strains the saw in a perfect manner.

The usual reciprocating movement is given the saw by means of a crank, F, and pitman, G, the pitman being connected to the lower slide. As the saw operates or moves up and down the bar, E', works or oscillates on the pivot, (*a*), and the saw will be strained equally taut at all points of its stroke.

I do not confine myself to the precise position or arrangement of the parts as herein shown, for that may be varied or modified as circumstances require. The invention is simple and efficient and may be applied to all muley saws, whether used for light or heavy work.

Having thus described my invention, what I claim as new and desire to secure by Letters Patent, is—

Straining the saw by attaching its ends to a pivoted elastic bar, E', substantially as shown and described.

THEODORE SHARP.

Witnesses:
   A. W. JEROME,
   T. B. WHEELER.